United States Patent [19]
Harris et al.

[11] Patent Number: 5,539,265
[45] Date of Patent: Jul. 23, 1996

[54] SELF-ALIGNING ROTOR ASSEMBLY

[75] Inventors: Richard K. Harris, Walled Lake; Michael T. York, Whitmore Lake, both of Mich.

[73] Assignee: Ford Motor Company, Dearborn, Mich.

[21] Appl. No.: 320,367

[22] Filed: Oct. 11, 1994

[51] Int. Cl.$^6$ ................................................. H02K 1/22
[52] U.S. Cl. ........................... 310/263; 310/194; 310/51
[58] Field of Search ................................ 310/51, 194, 263

[56] References Cited

U.S. PATENT DOCUMENTS

| | | | |
|---|---|---|---|
| 3,230,404 | 1/1966 | Graham | 310/51 |
| 3,253,167 | 5/1966 | Bates et al. | 310/263 X |
| 3,603,825 | 9/1971 | Sheridan et al. | 310/194 |
| 3,671,906 | 6/1972 | Hodges et al. | 310/263 X |
| 4,114,056 | 9/1978 | Nimura | 310/194 X |
| 4,617,485 | 10/1986 | Nakamura et al. | 310/263 X |
| 5,306,977 | 4/1994 | Hayashi | 310/263 |
| 5,325,003 | 6/1994 | Saval et al. | 310/71 X |
| 5,329,199 | 7/1994 | Yockey et al. | 310/263 |
| 5,361,011 | 11/1994 | York | 310/194 |

FOREIGN PATENT DOCUMENTS

| | | |
|---|---|---|
| 0270718 | 6/1988 | European Pat. Off. . |
| 2612349 | 3/1987 | France . |
| 692003 | 10/1979 | U.S.S.R. . |

Primary Examiner—Mark O. Budd
Attorney, Agent, or Firm—Mark S. Sparschu; Roger L. May

[57] ABSTRACT

An alternator rotor assembly comprises two "claw pole" pole pieces and a field coil assembly mounted between the pole pieces for rotation therewith. The field coil assembly comprises a bobbin and a coil of wire wound around the body of the bobbin. The bobbin further comprises two walls extending radially away from the center of the bobbin, between which the coil wire is wound. Projecting from the walls are flaps which extend radially outward. The flaps are designed to be bent over by the pole fingers as the rotor assembly is assembled. When so bent over, the flaps help retain the coil wire on the bobbin and help prevent short-circuiting of the coil wire to the inner radius defined by the pole fingers. The ends of the flaps have notches. In one embodiment of the invention, the notches are adapted to allow insertion of the ends of the pole fingers. The notches in the flaps help assure alignment of the flaps and the pole fingers as assembly is begun. In a second embodiment of the invention, the notches are also adapted to allow insertion of projections in a silencer insert assembly which is disposed between the pole pieces. In this second embodiment, alignment of the flaps of the bobbin and the fingers of the pole pieces is facilitated by the notches in the flaps and the projections of the silencer insert.

6 Claims, 3 Drawing Sheets

5,539,265

SELF-ALIGNING ROTOR ASSEMBLY

BACKGROUND OF THE INVENTION

1. Field of the Invention

The present invention relates to electrical machines generally, and more specifically to rotor assemblies for electrical machines.

2. Description of the Related Art

The rotor assembly of an automobile alternator of the "claw pole" variety generally comprises two opposing "claw pole" pole pieces with intermeshing fingers. The two "claw pole" pole pieces define an inner space in which is disposed a field coil assembly.

The field coil assembly normally comprises a bobbin around which is wound a coil of wire. The field coil assembly is then affixed to the two "claw pole" pole pieces for rotation therewith.

In order to maximize the power output capability of an alternator, it is advantageous to incorporate as much wire into the field coil assembly as possible, to maximize the electromagnetic field generated by the field coil. However, maximizing the amount of wire can cause two problems. First, the wire can tend to "spill" out of the bobbin as the rotor rotates during operation of the alternator. Second, the wire can tend to short-circuit against the inner radius defined by the pole fingers of the two "claw pole" pole pieces.

One solution to the two problems is the incorporation of flaps which project radially outward from the walls of the coil bobbin. Typically, each wall of the bobbin would have as many flaps as the number of pole fingers on one "claw pole" pole piece. The flaps on each wall of the bobbin would further be disposed such that they would each be bent over the field coil by one pole finger of a "claw pole" pole piece when the rotor were assembled. The flaps thereby bent over help eliminate the two problems referenced above which are encountered when trying to maximize the wire in the field coil of the alternator. Specifically, the flaps when bent over help retain the field coil wire in the bobbin. Also, the flaps provide an electrically insulating barrier between the coil wire and the inner radius defined by the pole fingers of the two "claw pole" pole pieces.

Although the bobbin flaps are quite effective in eliminating the two above-referenced problems, the flaps introduce one problem of their own. Because the flaps are bent over by pole fingers of the "claw pole" pole pieces, alignment between the pole fingers and the bobbin flaps must be maintained as the rotor is assembled. Because the bobbin flaps normally have significant stiffness, such alignment is often hard to maintain. The result is a rotor assembly process which can be difficult.

Therefore, a rotor which is designed to facilitate alignment of the pole fingers with the bobbin flaps will provide advantages over the prior art. Specifically, assembly of such a rotor will be made considerably easier.

SUMMARY OF THE INVENTION

The present invention provides a rotor for an electrical machine. The rotor comprises a bobbin, which further comprises a body, the body further defining a center and an axis of rotation extending through the center. The bobbin further includes a first wall extending radially from the body away from the center and a second wall also extending radially from the body away from the center. The bobbin also comprises at least one flap extending from the first wall radially away from the center, each flap having an end, the end of at least one flap containing a notch. In addition to the bobbin, the rotor assembly includes a coil comprising wire wound around the body of the bobbin between the first wall and the second wall of the bobbin.

The present invention helps solve the alignment problem detailed above in the assembly of an alternator rotor. By doing so, the invention provides advantages over the prior art.

DETAILED DESCRIPTION OF THE PREFERRED EMBODIMENT

Figure 1:
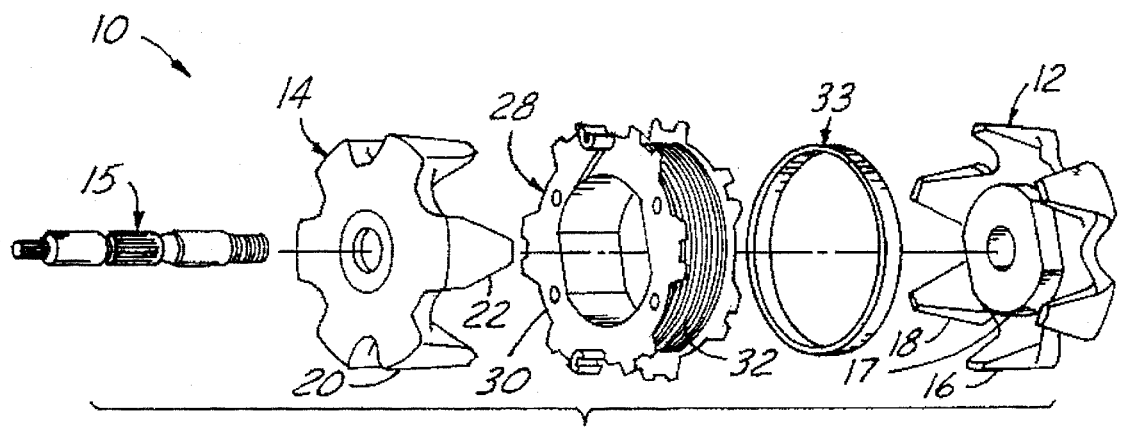
FIG. 1 is an exploded view showing the principal components of an alternator rotor assembly 10 according to one embodiment of the present invention.

Referring to FIG. 1, an alternator rotor 10 according to one embodiment of the present invention will be described. Rotor 10 comprises a first pole piece 12 and a second pole piece 14. Those skilled in the art will recognize pole pieces 12 and 14 as pole pieces from a "claw pole" rotor. First pole piece 12 and second pole piece 14 are mounted on a shaft 15. Shaft 15 is rotatably mounted within the alternator assembly as a whole, the mounting not being shown in FIG. 1 because it is conventional in the alternator art.

Pole pieces 12 and 14 each comprise fingers (such as fingers 16, 18, 20 and 22). The fingers of first pole piece 12 intermesh with the fingers of second pole piece 14 when rotor 10 is assembled. In general, there are gaps between the fingers of first pole piece 12 and second pole piece 14 when the fingers of the pole pieces are intermeshed. Such an assembly of first pole piece 12 and second pole piece 14 is con, non in the alternator art.

Mounted between first pole piece 12 and second pole piece 14 is coil assembly 28. Coil assembly 28 comprises bobbin 30 and field coil 32. Field coil 32 comprises wire wound around bobbin 30.

Also mounted between first pole piece 12 and second pole piece 14 is noise ring 33. Noise ring 33 is a metal ring which bears against the inner surfaces of the fingers of pole pieces 12 and 14. Noise ring 33 helps prevent vibration of the fingers of pole pieces 12 and 14 as rotor assembly 10 rotates within the alternator assembly as a whole. That reduction in vibration reduces audible noise generated by the alternator assembly. The use of noise ring 33 is known in the art of alternator rotors.

Figure 2:
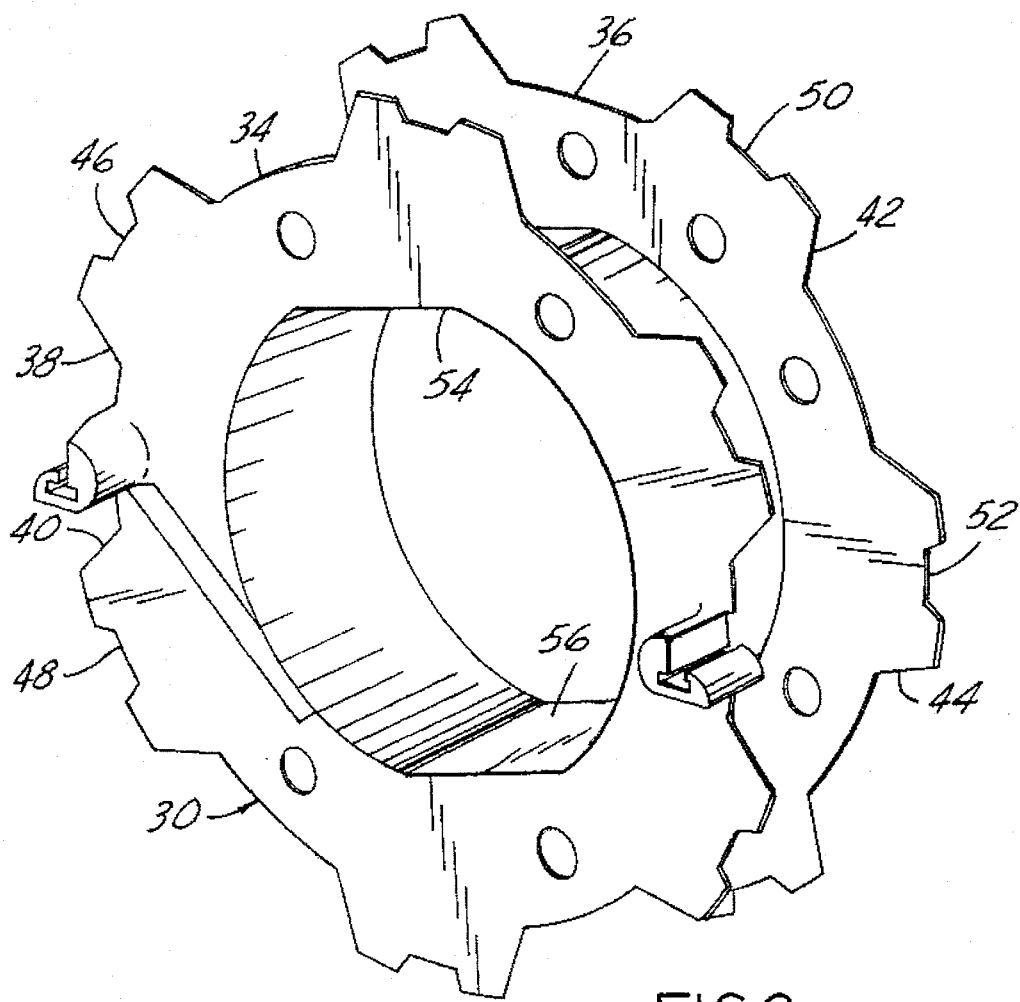
FIG. 2 is a perspective view of coil bobbin 30 of FIG. 1.

Referring now to FIG. 2, bobbin 30 will be described in further detail. Bobbin 30 is preferably made of an electrically insulating material such as plastic. Bobbin 30 comprises walls 34 and 36 between which field coil 32 (FIG. 1) is wound. Extending as projections of walls 34 and 36 are flaps (for example, flaps 38 and 40 extending from wall 34 and flaps 42 and 44 extending from wall 36). The flaps further have notches (for example, notch 46 on flap 38, notch 48 on flap 40, notch 50 on flap 42, and notch 52 on flap 44).

Referring now both to FIG. 1 and FIG. 2, coil assembly 28 is mounted between first pole piece 12 and second pole piece 14. Flats 54 and 56 on bobbin 30 cooperate with corresponding flats on hub 17 of first pole piece 12 and the hub (hidden in FIG. 1) of second pole piece 14, to help affix coil assembly 28 to pole pieces 12 and 14 for rotation therewith. This method of affixing coil assembly 28 to pole pieces 12 and 14 is disclosed in pending U.S. patent application Ser. No. 08/161,561 by York, the disclosure of which is hereby incorporated by reference.

Figure 3:
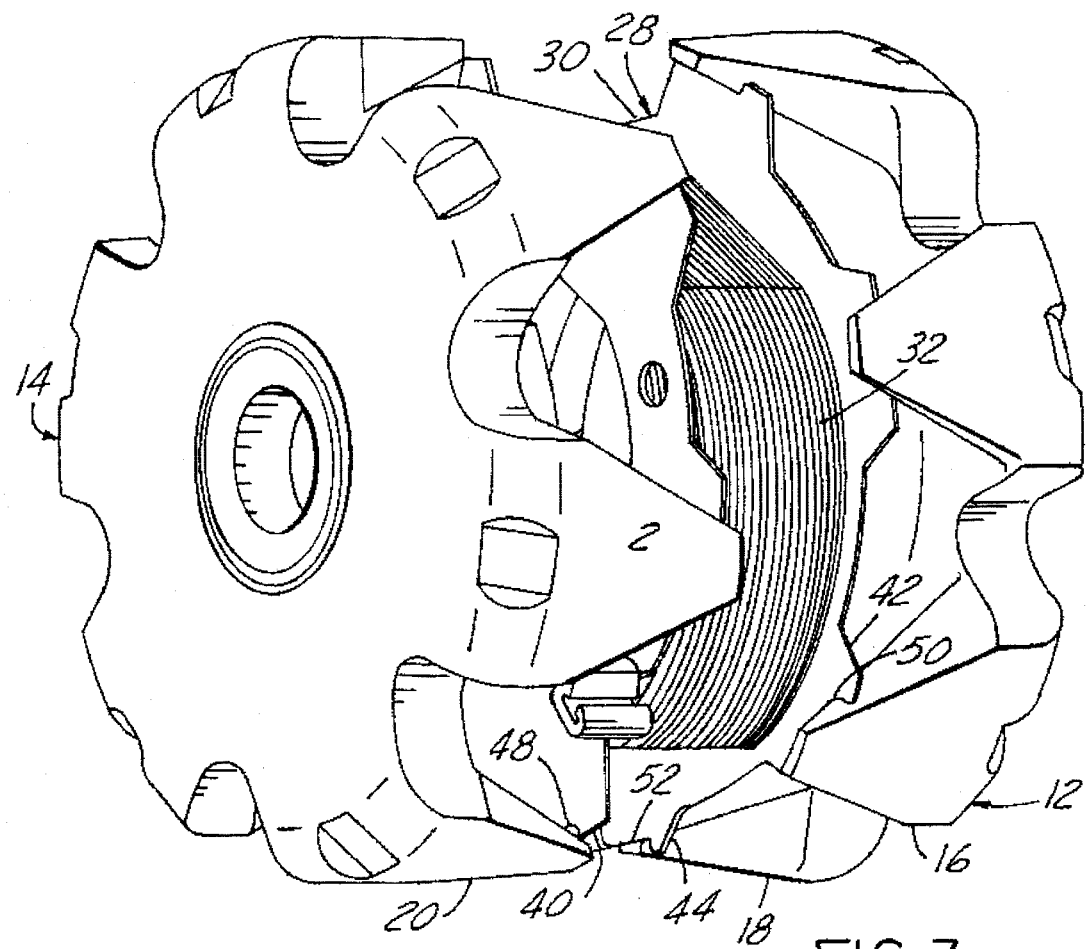
FIG. 3 is a partial assembly drawing of rotor assembly 10 of FIG. 1.

The assembly of pole pieces 12 and 14 and coil assembly 28 is illustrated with reference to FIGS. 2 and 3. (Note that noise ring 33 (FIG. 1) is not shown in FIG. 3 for simplicity.) Here, it is seen that the flaps on bobbin 30 (for example, flaps 38, 40, 42 and 44) are aligned with pole piece fingers (for example, fingers 16, 18, 20 and 22). When pole pieces 12 and 14 and coil assembly 28 are fully mated, the flaps on bobbin 30 are bent over field coil 32 by the pole piece fingers. The bending over of the flaps helps hold the wire of field coil 32 between walls 34 and 36 of bobbin 30 and helps prevent electrical shorting between the coil wire and the pole piece fingers (for example, fingers 16, 18, 20 and 22). The alignment between pole piece fingers (for example, fingers 16, 18, 20 and 22) and flaps of bobbin 30 (for example, flaps 38, 40, 42 and 44) is facilitated by the notches in the flaps (for example, notch 46 on flap 38, notch 48 on flap 40, notch 50 on flap 42, and notch 52 on flap 44). The notches cooperate with the pole fingers to assure alignment of the bobbin flaps (for example, flaps 38, 40, 42 and 44) with pole piece fingers (for example, fingers 16, 18, 20 and 22) as first pole piece 12, coil assembly 28 and second pole piece 14 are assembled.

Without the notches in the flaps of bobbin 30 (for example, notch 46 on flap 38, notch 48 on flap 40, notch 50 on flap 42, and notch 52 on flap 44), the assembly process of rotor 10 would be difficult. That difficulty would be due largely to the flaps on bobbin 30 being fairly stiff. As a result, alignment of the pole fingers (for example, fingers 16, 18, 20 and 22) with the flaps (for example flaps, 38, 40, 42 and 44) would be difficult to maintain as first pole piece 12, second pole piece 14 and coil assembly 28 are assembled.

Figure 4:
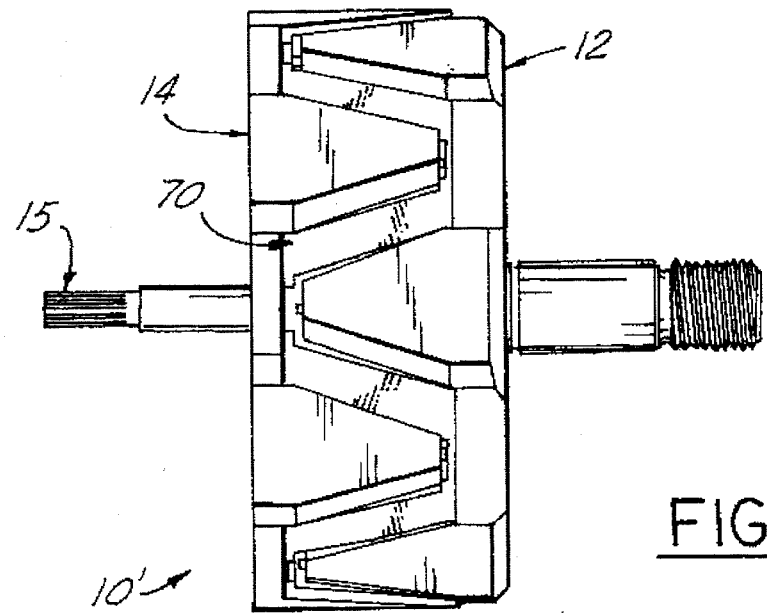
FIG. 4 is a side view showing the principal components of a rotor assembly 10' according to a second embodiment of the present invention.

A second embodiment of the present invention is illustrated with reference to FIG. 4. Here, in addition to first pole piece 12, second pole piece 14 and coil assembly 28, rotor assembly 10' comprises silencer assembly 70.

Figure 5:
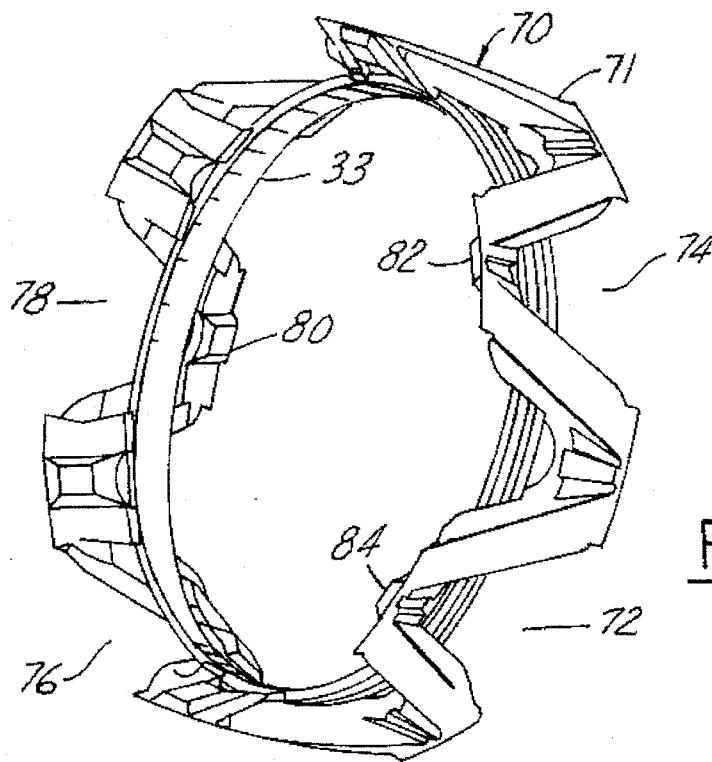
FIG. 5 is a perspective view of silencer assembly 70 of FIG. 4.

Silencer assembly 70 is more particularly illustrated with reference to FIG. 5. Silencer assembly 70 comprises silencer insert 71 and noise ring 33. Noise ring 33 snap-fits into the inner diameter of silencer insert 71. Silencer insert 71 is generally cylindrical in shape. The walls of silencer insert 71 are formed by material (preferably plastic) intended to fill gaps between fingers of pole piece 12 and pole piece 14 when rotor 10' is assembled and the fingers of first pole piece 12 and second pole piece 14 are intermeshed (FIG. 4). Silencer insert 71 therefore defines generally-triangular openings (for example, openings 72, 74, 76 and 78) which are shaped to accommodate the fingers of first pole piece 12 and second pole piece 14. By filling the gaps between the fingers of first pole piece 12 and second pole piece 14, silencer insert 71 is intended to reduce acoustic noise generated by the rotation of rotor assembly 10'. Additionally, noise ring 33 has the same purpose as has been previously described, namely reduction of vibration of the fingers of pole pieces 12 and 14.

Silencer insert 71 includes a series of guide ribs, or projections, such as guide ribs 80, 82 and 84. The guide ribs project generally toward the center of silencer insert 71. The function of the guide ribs is described with reference to FIG. 6.

Figure 6:
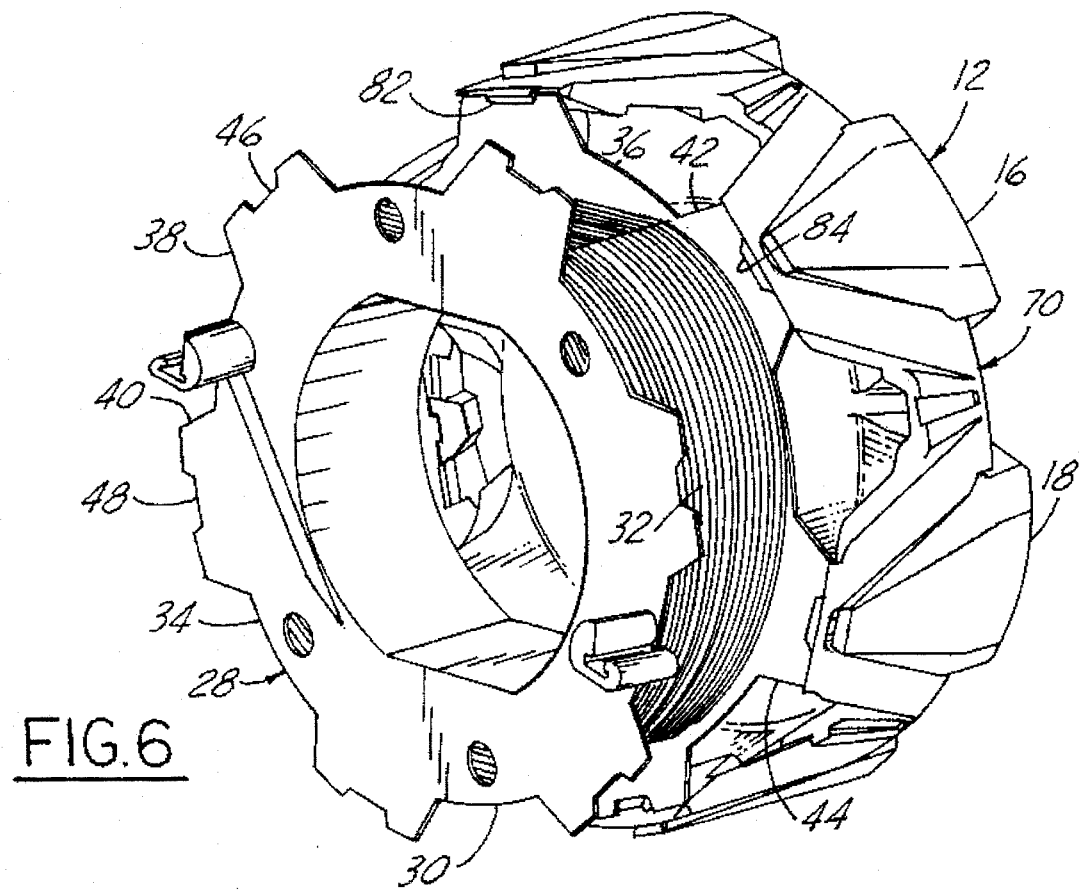
FIG. 6 is a partial assembly drawing of rotor assembly 10' of FIG. 4.

FIG. 6 is a partial assembly drawing of rotor 10' showing first pole piece 12, silencer assembly 70 and coil assembly 28. (Note that noise ring 33 is not shown in FIG. 6 for simplicity.) During the assembly of rotor 10', first pole piece 12 and silencer assembly 70 are first assembled. Next, coil assembly 28 is mated with the subassembly comprising first pole piece 12 and silencer assembly 70. As discussed previously, the flaps of bobbin 30 (such as flaps 42 and 44 in wall 36 of bobbin 30) are fairly stiff. That stiffness tends to discourage alignment of the flaps of bobbin 30 with the fingers of first pole piece 12 (for example, fingers 16 and 18) during the beginning of the assembly of coil assembly 28 to the subassembly comprising first pole piece 12 and silencer assembly 70. However, due to cooperation between the notches in bobbin 30 (such as notch 50 in flap 42 and notch 52 in flap 44—see also FIG. 2) and the guide ribs of silencer insert 71 (such as guide ribs 82 and 84), alignment is facilitated as coil assembly 28 begins to be assembled to the subassembly comprising first pole piece 12 and silencer assembly 70.

Second pole piece 14 (FIG. 4) is then assembled to the subassembly illustrated in FIG. 6. As that assembly begins, the notches in the flaps of wall 34 of bobbin 30 (for example, notch 46 in flap 38 and notch 48 in flap 40) cooperate with the pole fingers (for example, fingers 20 and 22) of second pole piece 14 to assure alignment of the pole fingers with the flaps (for example flaps 38 and 40) of bobbin 30.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A rotor for an electrical machine, said rotor comprising:

a bobbin further comprising a body further defining a center and an axis of rotation extending through said center; a first wall extending radially from said body away from said center; a second wall extending radially from said body away from said center; and at least one flap extending from said first wall radially away from said center, each said at least one flap having an end, said end of at least one said flap containing a notch;

a coil comprising wire wound around said body of said bobbin between said first wall and said second wall; and a first pole piece comprising a generally circular body defining a center, an axis of rotation and a periphery, and a plurality of pole fingers extending from said periphery parallel to said axis of rotation, each said pole finger having an end; wherein said bobbin is coaxially coupled to said first pole piece for rotation therewith;

said at least one notch is shaped to accommodate insertion of the end of one of said pole fingers as said bobbin and said first pole piece are coupled; and said flaps are bent over said body of said bobbin by said pole fingers.

2. A rotor for an electrical machine as recited in claim 1, further comprising:

a second pole piece comprising a generally circular body defining a center, an axis of rotation and a periphery, and a plurality of pole fingers extending from said periphery parallel to said axis of rotation, each said pole finger having an end; wherein said second pole piece is coaxially coupled to said bobbin for rotation therewith;

said bobbin further comprises at least one flap extending from said second wall radially away from said center of said bobbin, each said at least one flap having an end, said end of at least one said flap containing a notch, said at least one notch shaped to accommodate insertion of the end of one of said pole fingers of said second pole piece as said second pole piece is coupled to said bobbin; and said flaps extending from said second wall of said bobbin are bent over said body of said bobbin by said pole fingers of said second pole piece.

3. A rotor for an electrical machine, said rotor comprising:

a bobbin further comprising a body further defining a center and an axis of rotation extending through said center; a first wall extending radially from said body away from said center; a second wall extending radially from said body away from said center; and at least one flap extending from said first wall radially away from said center, each said at least one flap having an end, said end of at least one said flap containing a notch;

a coil comprising wire wound around said body of said bobbin between said first wall and said second wall;

first and second pole pieces each comprising a generally circular body defining a center, an axis of rotation extending through said center, and a periphery, and a plurality of pole fingers extending from said periphery parallel to said axis of rotation, each pole finger having an end, said bobbin coaxially coupled to said pole pieces for rotation therewith, said pole fingers of said pole pieces intermeshed, defining spaces between adjacent intermeshed pole fingers; and at least one insert comprising material shaped substantially as the shape of at least a portion of said spacing between said intermeshed pole fingers of said first and second pole pieces, said at least one insert located between said fingers of first and second pole pieces to at least partially fill said spacing between said fingers of said first and second pole pieces, said at least one insert further having at least one projection projecting generally toward said axes of rotation of said pole pieces and shaped to accommodate a said notch of said bobbin as said first pole piece, said bobbin, and said insert are assembled.

4. A rotor for an electrical machine as recited in claim 3, wherein said rotor comprises exactly one said insert and wherein said insert is generally cylindrical.

5. A rotor for an electrical machine as recited in claim 4, wherein:

said bobbin further comprises at least one flap extending from said second wall radially away from said center, each said at least one flap having an end, said end of at least one said flap containing a notch, said at least one notch shaped to accommodate the insertion of the end of one of said pole fingers of said second pole piece as said second pole piece is coupled to said bobbin; and said flaps extending from said second wall of said bobbin are bent over said body of said bobbin by said pole fingers of said second pole piece.

6. A rotor assembly as recited in claim 3, wherein said flaps are bent over said body of said bobbin by said fingers of said first pole piece.

* * * * *